United States Patent [19]
Robinson et al.

[11] Patent Number: 5,941,648
[45] Date of Patent: Aug. 24, 1999

[54] PERSONAL DIGITAL ASSISTANT HAVING A FOLDABLE KEYBOARD COMPONENT

[75] Inventors: Robert J. Robinson, Jamison, Pa.; Robert Staubitz, Collinsville, Conn.

[73] Assignee: Olivetti Office U.S.A., Inc., Bridgewater, N.J.

[21] Appl. No.: 09/176,373

[22] Filed: Oct. 21, 1998

[51] Int. Cl.⁶ .................................................. B41J 3/54
[52] U.S. Cl. ........................ 400/82; 400/88; 400/100; 400/472; 400/486; 400/489
[58] Field of Search ................... 400/100, 486, 400/489, 682, 88, 472, 82; 379/447; 361/680; 341/22

[56] References Cited

U.S. PATENT DOCUMENTS

| | | | |
|---|---|---|---|
| D. 310,093 | 8/1990 | Sakaguchi et al. | D18/7 |
| D. 388,456 | 12/1997 | Takahata et al. | D18/2 |
| 3,940,758 | 2/1976 | Margolin | 340/337 |
| 4,939,514 | 7/1990 | Miyazaki | 341/22 |
| 5,059,048 | 10/1991 | Sirkin | 400/486 |
| 5,267,127 | 11/1993 | Pollitt | 361/680 |
| 5,278,779 | 1/1994 | Conway et al. | 364/708.1 |
| 5,410,333 | 4/1995 | Conmay | 345/169 |
| 5,457,453 | 10/1995 | Chiu et al. | 341/22 |
| 5,574,481 | 11/1996 | Lee | 345/168 |
| 5,595,449 | 1/1997 | Vitkin | 400/472 |
| 5,653,543 | 8/1997 | Abe | 400/489 |
| 5,712,760 | 1/1998 | Coulon et al. | 361/680 |
| 5,841,635 | 11/1998 | Sadler et al. | 361/749 |

OTHER PUBLICATIONS

Olivetti Website article advertising the Royal daVinci PDA with foldable keyboard, pp. 1–2, Feb. 27, 1999.

Primary Examiner—Edgar Burr
Assistant Examiner—Charles H. Nolan, Jr.
Attorney, Agent, or Firm—Roberts & Mercanti, LLP

[57] ABSTRACT

A computing assembly which comprises a hand held computer or PDA that contains a housing, a processor in said housing and an input/output arrangement in said housing coupled to said processor for inputting data to, and outputting data from the processor and a foldable keyboard electrically connected to the PDA. The foldable keyboard has first and second planar keyboard halves having a plurality of depressable keys arranged on a surface. The keyboard halves have complementary curved outer peripheral edges and are attached to one another by an intermediate hinge. When in the open position, the first keyboard half is substantially coplanar with the second keyboard half, and the peripheral edges of the first and second keyboard halves form a substantially continuous curvilinear path. When in the closed position, the first keyboard half is folded over, substantially congruent in shape with, and in a plane parallel to the plane of the second keyboard half. Means are provided for electrically connecting the first and second keyboard halves to the hand held computer.

20 Claims, 4 Drawing Sheets

PERSONAL DIGITAL ASSISTANT HAVING A FOLDABLE KEYBOARD COMPONENT

BACKGROUND OF THE INVENTION

1. Field of the Invention

The present invention relates to microprocessor based devices operable while being held in a user's hand, such as a handheld computer. More particularly, the present invention pertains to handheld computing devices such as a personal digital assistant (PDA). The invention provides a foldable, pocket sized keyboard useful for such PDA's.

2. Description of the Related Art

Portable computing and communication devices are quickly becoming ubiquitous tools for both business and personal activities. The smallest and lightest of these devices are suitable for and most often carried and operated while being held in the hand of its user.

Portable data processing devices that assist with processing and information needs include calculators, organizers, personal digital assistants (PDAs), and notebook/laptop computers. Calculators are, of course, limited to mathematical operations. Organizers are able to receive information, store, process, and display certain types of alphanumeric information. Typically, they are used for keeping track of appointments and the like. Organizers differ from calculators in that they handle text information. Physically, organizers they are small enough to fit in a pocket or purse. While organizers can be thought of as computers, they hold a separate niche in the market because of their small size and the collection of special software packages employable, including a special operating system. An operating system is a set of fixed programs that control the general operation of the organizer, including the manner of interaction with the user. PDA's are small devices, typically smaller than a notebook computer, which store personal information and also may serve as an interface to communications. They typically include a means for data input; data processing means; display; and optionally telecommunications capabilities. PDAs, which are much more versatile computers, are often characterized by a relatively large touch sensitive screen which serves as both the input and output interface. PDA's have a unique operating system that accomplishes most calculating and data storage tasks by guiding the user through a sequence of selections. Typically, the operating system also includes an application for character recognition of script writing.

PDA's commonly have touch sensitive displays, or pressure sensitive screens such as are used in pen based computers. Such a display or screen offers a graphical user interface that allows the user to invoke and direct the information processing capabilities of the PDA and to input information by a simulated keypad. When the keypad is simulated, an image of a numerical keypad or alphabetical typewriter key layout appears on the screen. In these modes, a touch on the screen by a finger or a hard object such as a stylus, at the image of a key or button, results in the corresponding number or letter being input to the PDA. This approach has the disadvantage that the touch-sensitive screen feels unfamiliar to a user accustomed to using a mechanical keypad, so that the user is likely to make mistakes if entering data quickly. Whereas historically user input to computing and communication devices has been primarily through a keyboard, pen computers and PDAs have eliminated the keyboard, not only because its size and weight often make it inconvenient and impracticable to carry and use, but also because many mobile tasks require a more limited extent of textual input. As experience with these devices has increased, however, it has been recognized that from time to time nearly all applications and users would benefit from the ability to perform keyboard input. The tactile familiarity of the keypad increases the flexibility and ease of use of the device. Some PDAs do include a socket to connect to the cable from a conventional keyboard, however, such keyboards are large devices which are impractical to be portable. Attempts to incorporate keyboards with PDA's invariably produce units that are large, heavy, expensive, complex and difficult and cumbersome to transform from keyboard input to keyboardless operation. However, given the inconvenience of carrying, connecting and operating a completely external keyboard, PDA users almost universally elect to go without keyboard input even in those relative frequently occurring situations in which it would be beneficial.

What is needed is a PDA having a keyboard which is truly portable. It is, therefore, an object of the present invention to provide a device that permits the inclusion of a keyboard with a handheld computer. The present invention provides an improved PDA arrangement wherein data input is facilitated through a foldable, pocket sized keyboard which is conveniently portable together with the PDA. Foldable keyboards are known in the art. For example, foldable keyboards are known from U.S. Pat. No. 5,278,779; U.S. Pat. Nos. Des. 388,456; 5,653,543; 5,574,481; 5,457,453; 5,410,333; 5,267,127; 4,939,514; and 3,940,758. U.S. Pat. Des. 310,093 shows a folding calculator having a keyboard portion and a photocell portion. Such do not pertain to a portable, folding keyboard attachable to a PDA.

SUMMARY OF THE INVENTION

The invention provides a foldable keyboard which comprises:

a) a first substantially planar keyboard half having a plurality of depressable keys arranged on a surface;

b) a second substantially planar keyboard half having a plurality of depressable keys arranged on a surface;

c) the first and second keyboard halves having complementary curved outer peripheral edges, the halves being attached to one another by an intermediate hinge such that when in the open position, the first keyboard half is substantially coplanar with the second keyboard half, and the peripheral edges of the first and second keyboard halves form a substantially continuous curvilinear path; and when in the closed position, the first keyboard half is folded over, substantially congruent in shape with, and in a plane parallel to the plane of the second keyboard half; and d) means for electrically connecting the first and second keyboard halves to a hand held computer.

The invention also provides a computing assembly which comprises a hand held computer that contains a housing, a processor in said housing and an input/output arrangement in said housing coupled to said processor for inputting data to, and outputting data from, said processor; and the above described foldable keyboard electrically connected to said hand held computer.

The invention further provides a hand held computer which comprises a substantially flat housing having front and rear surfaces, a top edge, a bottom edge and left and right side edges; a microprocessor in said housing and an input/output arrangement in said housing coupled to said microprocessor for inputting data to, and outputting data from said microprocessor; the front surface comprising a touch sensitive screen; a lid for covering said touch sensitive screen, said lid being attached to an edge of said housing by a pair of intermediate hinges wherein said hinges are contiguous to one another, one hinge is attached to the lid and the other hinge is attached to the housing edge such that the lid is capable of alternatively covering the touch sensitive screen or being folded behind the rear surface.

DETAILED DESCRIPTION OF THE PREFERRED EMBODIMENT

Figure 1:
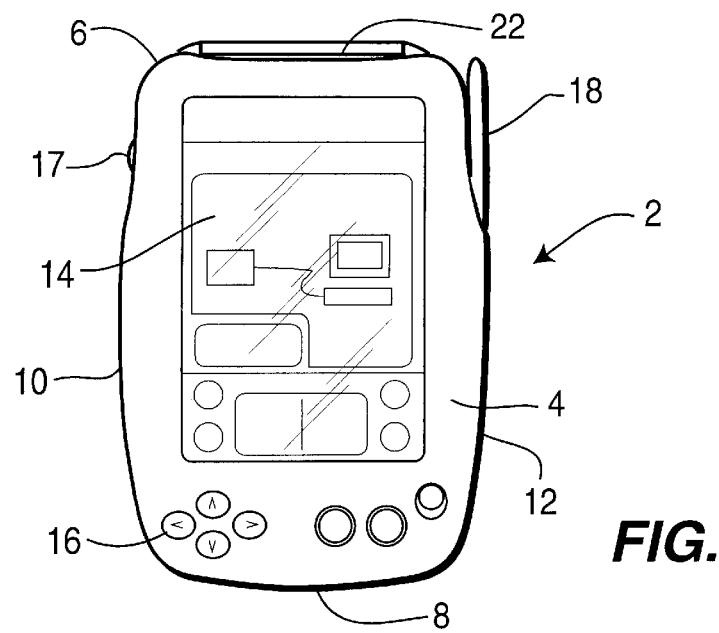
FIG. 1 shows a front view of a hand held PDA unit according to the invention showing a touch screen lid positioned at the rear of the housing.
Figure 2:
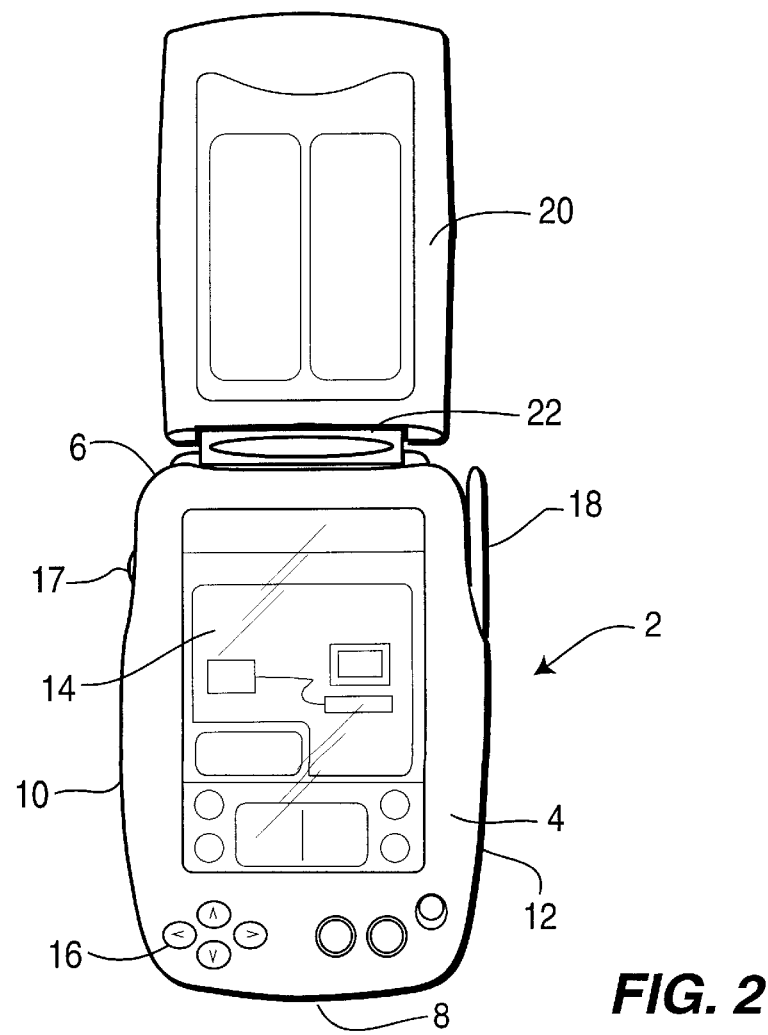
FIG. 2 shows a front view of a hand held PDA unit according to the invention showing a touch screen lid at an extended position.
Figure 3:
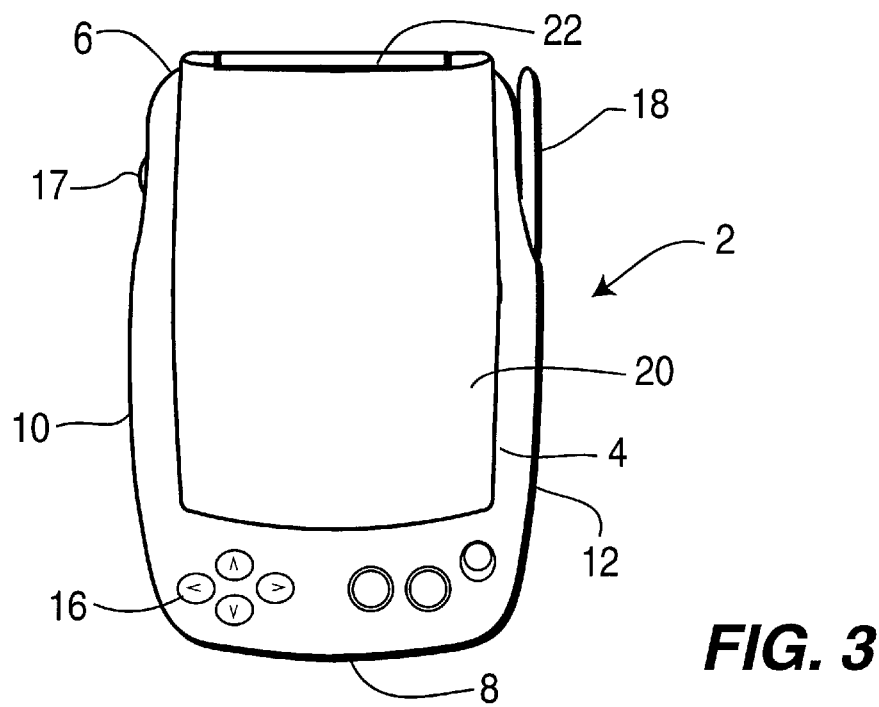
FIG. 3 shows a front view of a hand held PDA unit according to the invention showing the lid covering the touch screen.

FIG. 1 shows a front view of a hand held PDA unit 2 according to the invention. It has a substantially flat housing having front 4 and rear surfaces, a top edge 6, a bottom edge 8 and left and right side edges 10 and 12 respectively. A microprocessor, not shown is in the housing together with an input/output arrangement coupled to the microprocessor for inputting data to and outputting data from said microprocessor. The microprocessor and input/output are well known in the art such as from U.S. Pat. Nos. 5,625,673, 5,818,924 and 5,548,477 which are incorporated herein by reference. The front surface 4 comprises a touch sensitive screen 14 for inputting and displaying stored data. The front surface may have any number of control buttons 16 for controlling the display as well as variable contrast controller 17. Data may also be entered into storage by touching the screen with a pen or stylus 18 which may conveniently be stored in an opening in the right side of the housing. On the top edge 6 of the housing is a hinged lid 20 for covering the touch sensitive screen. The lid 20 is attached to the top edge 6 by a pair of intermediate hinges 22. The hinges 22 are contiguous to one another and one hinge 22 is attached to the lid 20 and the other hinge is attached to the top edge such 6 that the lid is capable of alternatively covering the touch sensitive screen or being folded behind the rear surface of the housing. FIG. 1 shows the lid positioned at the rear of the housing. FIG. 2 shows the lid at an extended position. FIG. 3 shows a front view of a hand held PDA unit according to the invention showing the lid covering the touch screen.

Figure 4:
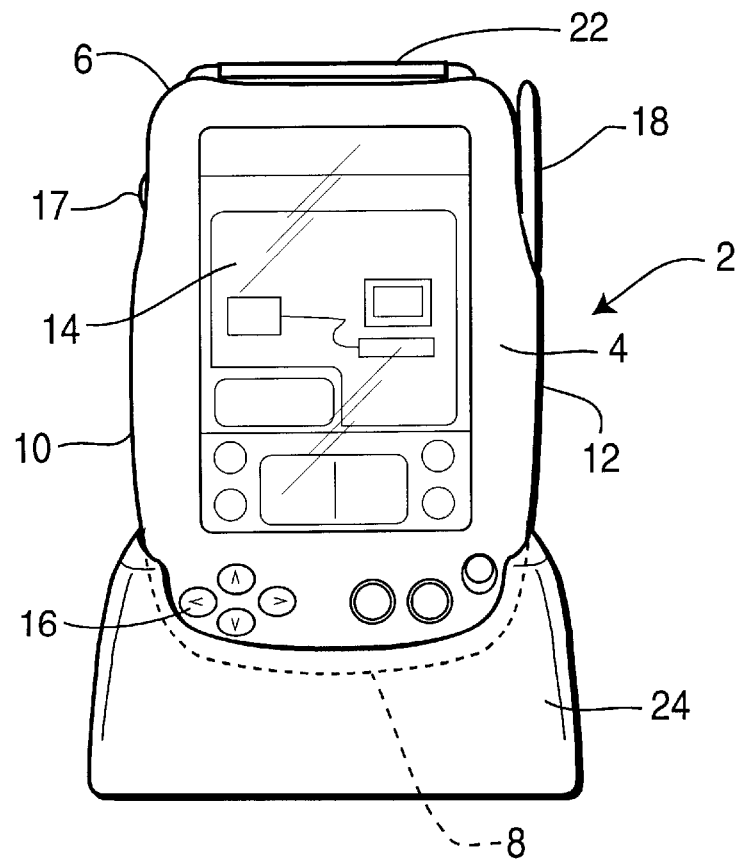
FIG. 4 shows a cradle 24 serves as a stand for holding the PDA in an upright position.

The bottom edge of 8 of the unit 2 preferably has a electrical connector for electrical connection to a cradle 24. As shown in FIG. 4, the cradle 24 serves as a stand for holding the PDA in an upright position for easy hands-free viewing.

Figure 5:
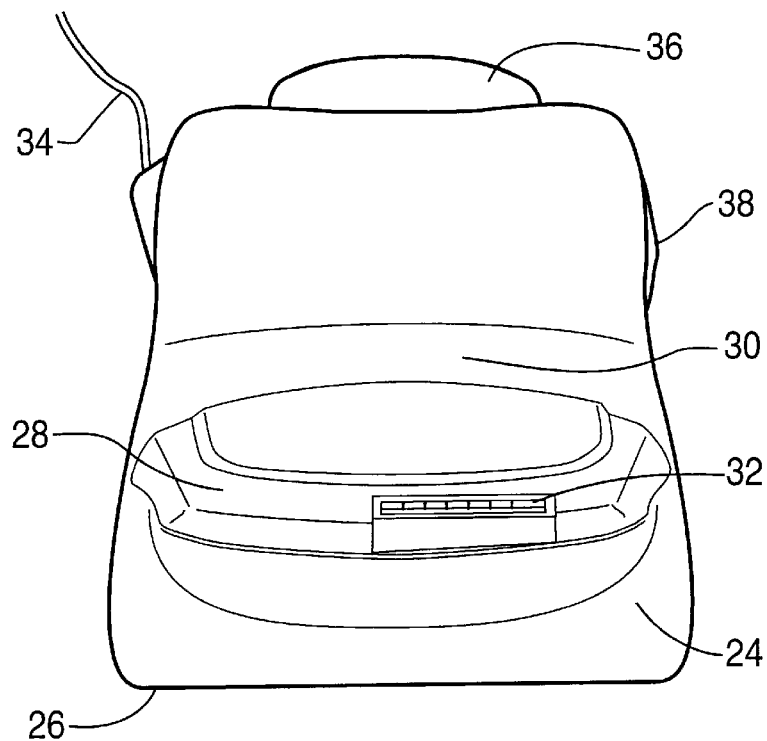
FIG. 5 shows a front perspective view of a cradle according to the invention.

FIG. 5 shows a front perspective view of a cradle 24 according to the invention. It has a housing 26, a space 28 for inserting the PDA unit 2, a cut out shelf portion 30 for positioning the lid 20 when it is set behind the PDA housing.

Electrical connector 32 cooperates with a corresponding connector on the bottom edge 8 of the PDA unit. The cradle is powered by a suitable electrical connector 34 to a step down transformer, not shown. At the rear of the cradle is a port 36 for connection either to a foldable keyboard as described hereinafter or to a standard PCMCIA card. Optionally an additional port 38 is provided for connection to a foldable keyboard in the event port 38 is a PCMCIA connection.

Figure 6:
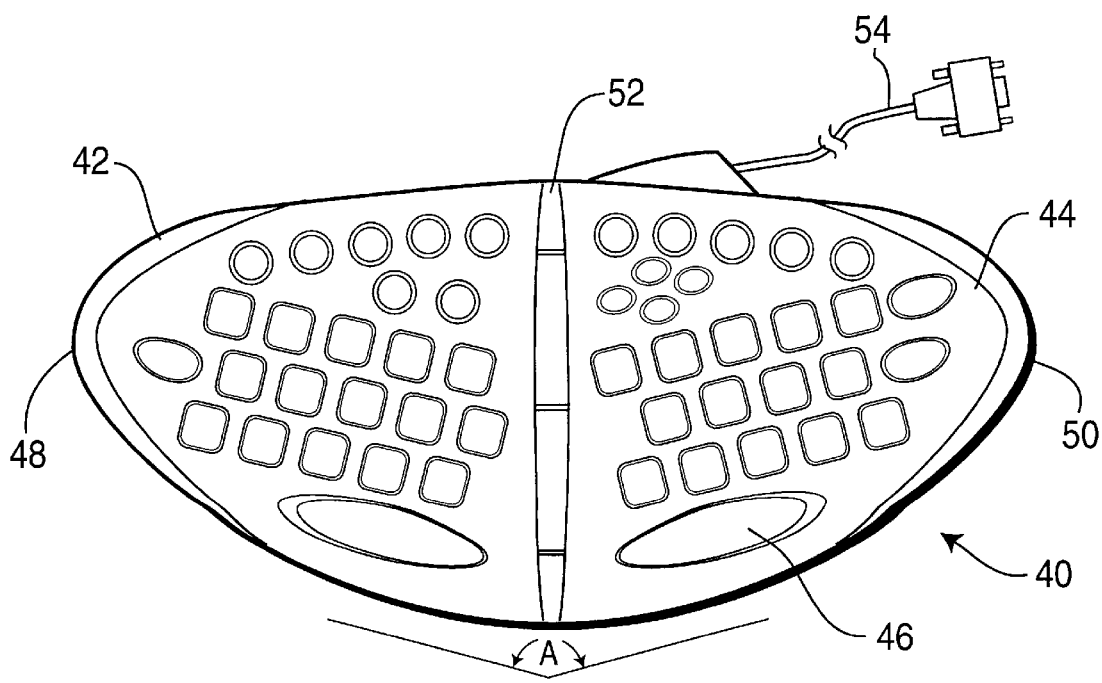
FIG. 6 shows a foldable keyboard according to the invention in the open position.

FIG. 6 shows a foldable keyboard 40 according to the invention. It has a first substantially planar keyboard half 42 and a second substantially planar keyboard half 44. Each keyboard half has a plurality of depressable keys 46 arranged on a surface. The first and second keyboard halves have complementary curved outer peripheral edges 48 and 50. The halves are attached to one another by an intermediate hinge 52 such that when in the keyboard is in the open position as shown in FIG. 6, the first keyboard half 42 is substantially coplanar with the second keyboard half 44, and the peripheral edges of the first and second keyboard halves form a substantially continuous curvilinear path around the periphery of the keyboard.

Figure 7:
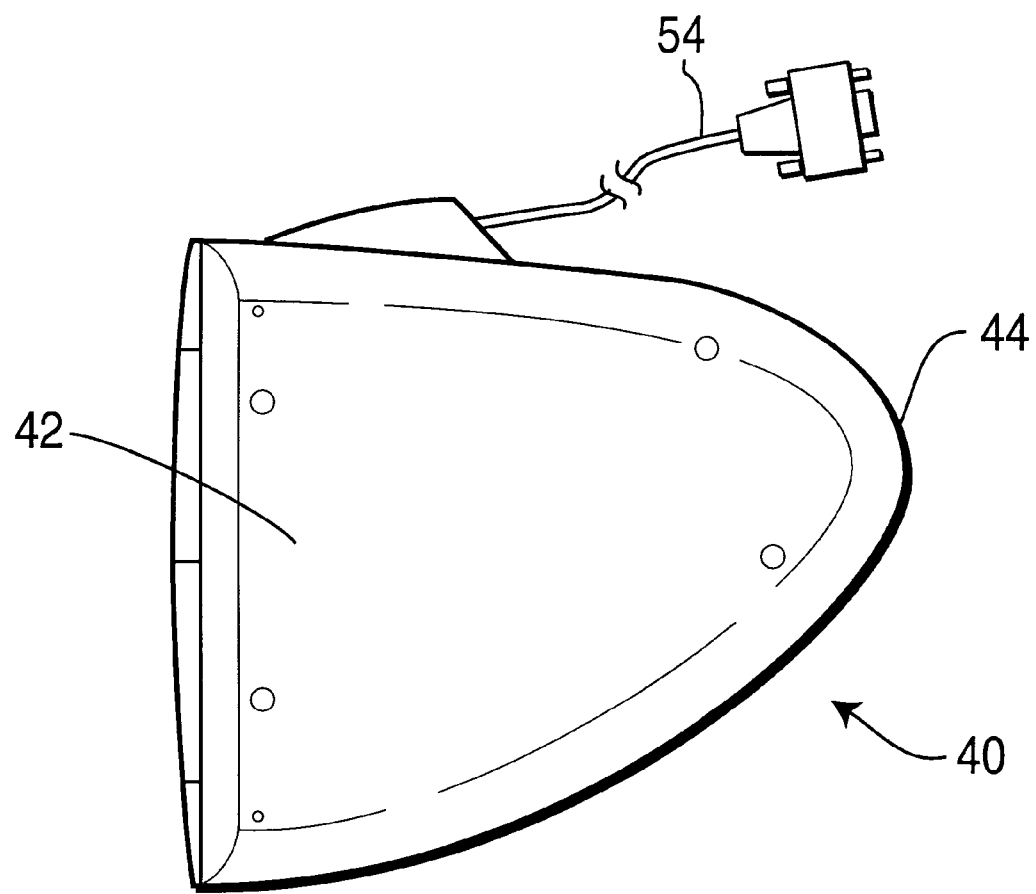
FIG. 7 shows the foldable keyboard in the closed position.

FIG. 7 shows the foldable keyboard 40 in the closed position. As may be seen, the first keyboard half 42 is folded over, substantially congruent in shape with, and in a plane parallel to the plane of the second keyboard half 44. Means 54 are provided for electrically connecting the first and second keyboard halves to a hand held computer via the connector 36 or 38 in the cradle 24.

Preferably the first and second keyboard halves are in the form of complementary symmetrical or asymmetrical parabolas as shown in FIGS. 6 and 7. By symmetrical parabolas, it is meant that the first and second keyboard halves are substantially parabolic in shape. That is, the outer peripheral edges are substantially equidistant from a fixed point and a line not through the point. By asymmetrical parabolas, it is meant that the first and second keyboard halves are substantially parabolic in shape, but are skewed at an angle from a true parabola. FIGS. 6 and 7 show asymmetrical first and second keyboard halves. Preferably the first and second keyboard halves are offset from one another at an angle A of from about 120° to about 180°, more preferably an angle of from about 135° to about 160° and most preferably at an angle of from about 145° to about 155°.

Those skilled in the art will recognize that the foregoing description has been presented for the sake of illustration and description only. As such, it is not intended to be exhaustive or to limit the invention to the precise form disclosed. Modifications and variations are possible in light of the above teaching that are considered to be within the spirit of the present invention.

What is claimed is:

1. A foldable keyboard which comprises:
    a) a first substantially planar keyboard half having a plurality of depressable keys arranged on a surface;
    b) a second substantially planar keyboard half having a plurality of depressable keys arranged on a surface;
    c) the first and second keyboard halves having complementary curved outer peripheral edges, the halves being attached to one another by an intermediate hinge such that when in the open position, the first keyboard half is substantially coplanar with the second keyboard half, and the peripheral edges of the first and second keyboard halves form a substantially continuous curvilinear path; and when in the closed position, the first keyboard half is folded over, substantially congruent in shape with, and in a plane parallel to the plane of the second keyboard half, and d) means for electrically connecting the first and second keyboard halves to a hand held computer.

2. The foldable keyboard of claim 1 wherein the first and second keyboard halves are in the form of complementary symmetrical or asymmetrical parabolas.

3. The foldable keyboard of claim 1 wherein the means for electrically connecting the first and second keyboard halves to a hand held computer comprises an electrical connection from the first and second keyboard halves to a cradle and an electrical connection from the cradle to the hand held computer.

4. The foldable keyboard of claim 1 wherein the first and second keyboard halves are offset from one another at an angle of from about 120° to about 180°.

5. The foldable keyboard of claim 1 wherein the first and second keyboard halves are offset from one another at an angle of from about 135° to about 160°.

6. The foldable keyboard of claim 1 wherein the first and second keyboard halves are offset from one another at an angle of from about 145° to about 155°.

7. The foldable keyboard of claim 1 wherein the first and second keyboard halves are in the form of complementary symmetrical or asymmetrical parabolas and wherein the first and second keyboard halves are offset from one another at an angle of from about 120° to about 180°.

8. A computing assembly which comprises a hand held computer that contains a housing, a processor in said housing and an input/output arrangement in said housing coupled to said processor for inputting data to, and outputting data from, said processor; a foldable keyboard electrically connected to said hand held computer, which foldable keyboard comprises:

a) a first substantially planar keyboard half having a plurality of depressable keys arranged on a surface;

b) a second substantially planar keyboard half having a plurality of depressable keys arranged on a surface;

c) the first and second keyboard halves having complementary curved outer peripheral edges, the halves being attached to one another by an intermediate hinge such that when in the open position, the first keyboard half is substantially coplanar with the second keyboard half, and the peripheral edges of the first and second keyboard halves form a substantially continuous curvilinear path; and when in the closed position, the first keyboard half is folded over, substantially congruent in shape with, and in a plane parallel to the plane of the second keyboard half; and d) means for electrically connecting the first and second keyboard halves to the hand held computer.

9. The assembly of claim 8 wherein said hand held computer includes a touch sensitive screen, and a hinged lid to cover said touch sensitive screen.

10. The assembly of claim 8 wherein the first and second keyboard halves are in the form of complementary symmetrical or asymmetrical parabolas.

11. The foldable keyboard of claim 8 wherein the first and second keyboard halves are in the form of complementary symmetrical or asymmetrical parabolas and wherein the first and second keyboard halves are offset from one another at an angle of from about 120° to about 180°.

12. The assembly of claim 8 wherein the means for electrically connecting the first and second keyboard halves to a hand held computer comprises an electrical connection from the first and second keyboard halves to a cradle and an electrical connection from the cradle to the hand held computer.

13. The apparatus of claim 8 wherein said cradle includes a PCMCIA connector.

14. A computing assembly which comprises a hand held computer which comprises a substantially flat housing having front and rear surfaces, a top edge, a bottom edge and left and right side edges; a microprocessor in said housing and an input/output arrangement in said housing coupled to said microprocessor for inputting data to, and outputting data from said microprocessor; the front surface comprising a touch sensitive screen; a lid for covering said touch sensitive screen, said lid being attached to an edge of said housing by a pair of intermediate hinges wherein said hinges are contiguous to one another, one hinge is attached to the lid and the other hinge is attached to the housing edge such that the lid is capable of alternatively covering the touch sensitive screen or being folded behind the rear surface, and further comprising a foldable keyboard attached to the hand held computers, which keyboard comprises:

a) a first substantially planar keyboard half having a plurality of depressable keys arranged on a surface;

b) a second substantially planar keyboard half having a plurality of depressable keys arranged on a surface;

c) the first and second keyboard halves having complementary curved outer peripheral edges, the halves being attached to one another by an intermediate hinge such that when in the open position, the first keyboard half is substantially coplanar with the second keyboard half, and the peripheral edges of the first and second keyboard halves form a substantially continuous curvilinear path; and when in the closed position, the first keyboard half is folded over, substantially congruent in shape with, and in a plane parallel to the plane of the second keyboard half; and d) means for electrically connecting the first and second keyboard halves to the hand and held computer.

15. The computing assembly of claim 14 wherein the hand held computer further comprises an electrical connector on said housing for electrically connecting to a cradle.

16. The computing assembly of claim 15 which comprises a cradle electrically connected to the electrical connector.

17. The computing assembly of claim 16 wherein the keyboard is electrically connected to the hand held computer through the cradle.

18. The computing assembly of claim 14 wherein the first and second keyboard halves are in the form of complementary symmetrical or asymmetrical parabolas and wherein the first and second keyboard halves are offset from one another at an angle of from about 120° to about 180°.

19. The computing assembly of claim 14 further comprising a PCMCIA connector electrically connected to the cradle.

20. The computing assembly of claim 19 further comprising a PCMCIA card electrically connected to the hand held computer through the cradle.

* * * * *